(12) United States Patent
Kozdras et al.

(10) Patent No.: US 7,540,431 B2
(45) Date of Patent: Jun. 2, 2009

(54) BY-PASS VALVE FOR HEAT EXCHANGER

(75) Inventors: Mark Stephen Kozdras, Fergus (CA); Jeff Sheppard, Milton (CA); Robert Arundine, Windsor (CA); Silvio Tonellato, Mississauga (CA); Dario Bettio, Mississauga (CA)

(73) Assignee: Dana Canada Corporation, Oakville, Ontario (CA)

( * ) Notice: Subject to any disclaimer, the term of this patent is extended or adjusted under 35 U.S.C. 154(b) by 524 days.

(21) Appl. No.: 10/997,672

(22) Filed: Nov. 24, 2004

(65) Prior Publication Data

US 2006/0108435 A1    May 25, 2006

(51) Int. Cl.
*F01P 7/02* (2006.01)
*G05D 23/00* (2006.01)

(52) U.S. Cl. ............. 236/93 R; 165/103; 165/283; 165/297; 137/535; 137/538; 137/540; 236/34.5

(58) Field of Classification Search ............... 236/93 R, 236/34.5; 165/103, 283, 297; 137/535, 538, 137/540; 251/321, 324
See application file for complete search history.

(56) References Cited

U.S. PATENT DOCUMENTS

| | | |
|---|---|---|
| 979,618 A | 12/1910 | Weir |
| 2,159,468 A | 5/1939 | Young et al. |
| 2,396,053 A | 3/1946 | McEntire |
| 2,433,454 A | 12/1947 | Hoffman |
| 2,469,212 A | 5/1949 | Shaw |
| 3,440,833 A | 4/1969 | Fernandes |
| 3,580,275 A * | 5/1971 | Hanson et al. ......... 137/516.29 |
| 3,779,306 A | 12/1973 | Wilson |

(Continued)

FOREIGN PATENT DOCUMENTS

EP         0 138 618        4/1985

OTHER PUBLICATIONS

Declaration of Inventor (Mark Stephen Kozdras) dated Nov. 15, 2005 with Exhibits A and B.
U.S. Appl. No. 09/045,891 entitled By-Pass Valves for Heat Exchangers filed Mar. 23, 1998 [abandoned].

*Primary Examiner*—Marc E Norman
(74) *Attorney, Agent, or Firm*—Ridout & Maybee LLP

(57) ABSTRACT

A valve that includes a housing defining first and second bores having a central axis, and a peripheral valve seat. An actuator is located in the first bore and has a reciprocating seal disposed for movement along the central axis for engaging the valve seat and closing the valve. A coiled return spring is mounted in the housing for urging the reciprocating seal towards the chamber to open the valve, the return spring having a first end connected to the reciprocating seal and a second end engaging a spring support in the housing facing the first bore. The return spring may have a larger diameter at its second end than its first end. The housing may include a third bore in communication with the second bore and having a different cross-sectional area than the second bore. A closure cap formed from moldable material may close an opening in the housing, the closure cap being sealably joined to the housing by a welded joint. The return spring could be supported by a discrete spring support located in one of the bores. The valve seat and an annular sealing member may have corresponding sloping surfaces that cooperate when the sealing member engages the valve seat.

10 Claims, 7 Drawing Sheets

U.S. PATENT DOCUMENTS

| | | |
|---|---|---|
| 3,943,970 A | 3/1976 | Knapp |
| 3,949,777 A | 4/1976 | Caldwell |
| 3,952,764 A | 4/1976 | Keller, III |
| 3,961,010 A | 6/1976 | Holmes |
| 4,024,909 A | 5/1977 | Hofmann, Jr. |
| 4,027,643 A | 6/1977 | Feenan et al. |
| 4,114,571 A | 9/1978 | Ruf |
| 4,190,198 A | 2/1980 | Casuga et al. |
| 4,214,781 A | 7/1980 | Joseph |
| 4,401,157 A | 8/1983 | Cadars |
| 4,527,681 A | 7/1985 | Sommer |
| 4,560,189 A | 12/1985 | Lang |
| 4,615,385 A | 10/1986 | Saperstein et al. |
| 4,669,532 A | 6/1987 | Tejima et al. |
| 4,688,311 A | 8/1987 | Saperstein et al. |
| 4,768,587 A | 9/1988 | Halder |
| 4,800,925 A | 1/1989 | Yeoman |
| 4,816,083 A | 3/1989 | Bangyan |
| 4,846,219 A | 7/1989 | Schaefer |
| 4,936,381 A | 6/1990 | Alley |
| 4,945,635 A | 8/1990 | Nobusue et al. |
| 4,972,877 A | 11/1990 | Halemba et al. |
| 4,998,580 A | 3/1991 | Guntly et al. |
| 5,025,855 A | 6/1991 | Hoshino et al. |
| 5,078,209 A | 1/1992 | Kerman et al. |
| 5,085,468 A | 2/1992 | Billotte |
| 5,139,050 A | 8/1992 | Otto |
| 5,152,338 A | 10/1992 | Dethier et al. |
| 5,244,036 A | 9/1993 | Michl |
| 5,375,623 A * | 12/1994 | Weber ...................... 137/454.5 |
| 5,423,373 A | 6/1995 | Ramberg |
| 5,551,506 A | 9/1996 | Nishishita |
| 5,553,664 A | 9/1996 | Nishishita et al. |
| 5,609,203 A | 3/1997 | Kinugasa et al. |
| 5,746,170 A | 5/1998 | Moriya |
| 5,791,557 A | 8/1998 | Kunze |
| 5,865,244 A | 2/1999 | Moser |
| 5,875,834 A | 3/1999 | Brooks |
| 5,904,292 A | 5/1999 | McIntosh |
| 5,964,282 A | 10/1999 | Seiler et al. |
| 5,988,265 A | 11/1999 | Marthaler |
| 6,161,614 A | 12/2000 | Woodhull et al. |
| 6,196,306 B1 | 3/2001 | Aikawa et al. |
| 6,220,343 B1 | 4/2001 | Ichiyanagi |
| 6,253,837 B1 | 7/2001 | Seiler et al. |
| 6,302,191 B1 | 10/2001 | Wickham et al. |
| 6,772,958 B1 * | 8/2004 | Lamb et al. ................. 236/34.5 |
| 6,843,210 B2 | 1/2005 | Engelin et al. |
| 2003/0019620 A1 | 1/2003 | Pineo et al. |

\* cited by examiner

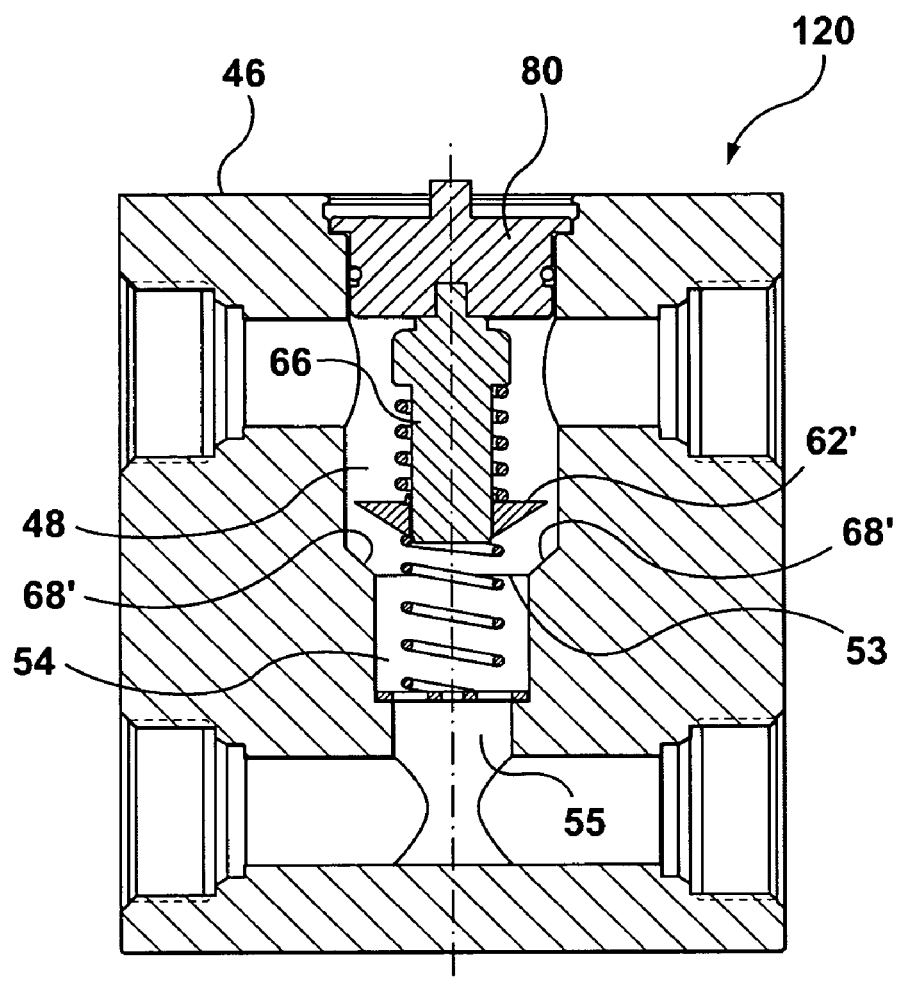
FIG. 12
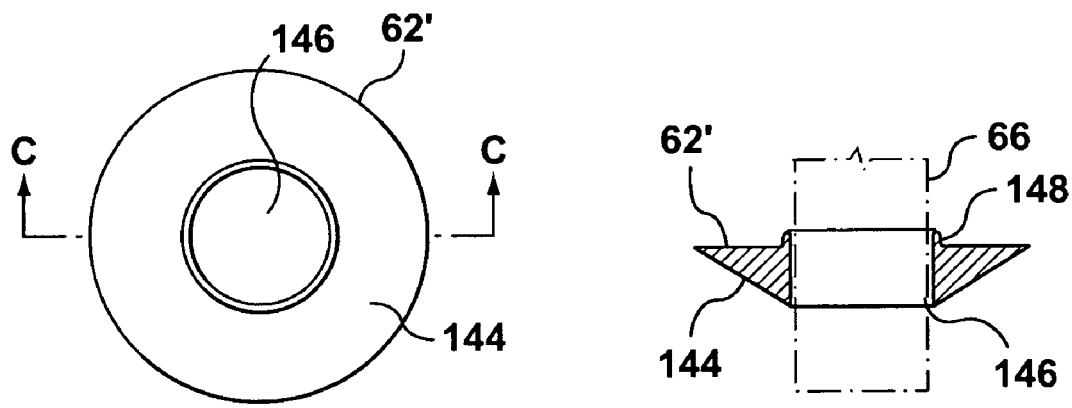
FIG. 13  FIG. 14

BY-PASS VALVE FOR HEAT EXCHANGER

FIELD OF THE INVENTION

This invention relates to heat exchangers, and in particular, to by-pass valves for by-passing a heat exchanger in a heat exchange circuit under conditions where the heat transfer function of the heat exchanger is not required or is only intermittently required.

BACKGROUND

In certain applications, such as in the automotive industry, heat exchangers are used to cool or heat certain fluids, such as engine oil or transmission fluid or oil. In the case of transmission fluid, for instance, a heat exchanger is used to cool the transmission fluid. The heat exchanger is usually located remote from the transmission and receives hot transmission oil from the transmission through supply tubing, cools it, and delivers it back to the transmission again through return tubing. However, when the transmission is cold, such as at start-up conditions, the transmission oil is very viscous and does not flow easily through the heat exchanger, if at all. In such cases, the transmission can be starved of oil and this may cause damage or at the least erratic performance. Cumulative damage to the transmission can also occur if the quantity of oil returned is adequate, but is overcooled due to low ambient temperatures. In this case, for instance, moisture condensation in the oil (that would otherwise be vaporized at higher temperatures) may accumulate and cause corrosion damage or oil degradation.

In order to overcome the cold flow starvation problem, various solutions have been proposed in the past. One solution is to use a by-pass path between the heat exchanger supply and return lines often with a heat-actuated by-pass valve located in the by-pass path. There have been shortcomings with many prior solutions, including for example, excessive leakage across the valve, sticking of the valve, heat transfer inefficiencies, and/or high cost.

A by-pass valve configuration that addresses many of the short comings of prior actuator valves is shown in U.S. Pat. No. 6,253,837.

However a by-pass valve having additional cost savings, space savings, weight savings and/or operational efficiencies is desirable for some applications.

SUMMARY

According to at least one example aspect of the invention is a heat exchanger by-pass, including a housing defining communicating first and second bores therein and first and second main ports communicating with the first bore, the second bore having a central axis and a peripheral valve seat about a valve opening facing the first bore. A temperature responsive actuator is located in the housing and has a reciprocating central shaft disposed along said central axis, the central shaft having a closed end portion. An annular sealing member slidably mounted on the central shaft extends outward from the central shaft to engage the valve seat and, together with the closed end portion, close the valve opening. The by-pass valve includes bias means for urging the annular sealing member toward the valve seat A coiled return spring is mounted in the housing for urging the central shaft closed end portion to retract and open the valve opening, the return spring having a first end connected to the closed end portion and a second end engaging a spring support in the housing facing the first bore. The return spring has a larger diameter at its second end than its first end.

According to at least one example aspect of the invention is a valve including a housing defining a first bore and a second bore having a common central axis and communicating with each other through a valve opening having a peripheral valve seat, the first bore, second bore and valve opening forming at least a portion of a closable flow path between a first opening and a second opening in the housing. An actuator located in the housing has a reciprocating seal disposed for movement along the central axis for engaging the valve seat and closing the valve opening. A coiled return spring is mounted in the housing for urging the reciprocating seal towards the first bore to open the valve opening, the return spring having a first end connected to the reciprocating seal and a second end engaging a spring support in the housing facing the first bore, the return spring having a larger diameter at its second end than its first end.

According to at least one example aspect of the invention is a by-pass valve for a heat exchanger circuit, including a housing defining a serially communicating first bore, second bore and third bore substantially aligned along a central axis with a valve seat facing the first bore at a juncture between the first bore and second bore and a spring seat facing the second bore at a juncture between the second bore and third bore, the first bore, second bore and third bore forming at least a portion of a closable flow path between a first opening and a second opening in the housing. The by-pass valve also includes an actuator located in the housing and having a reciprocating seal disposed for movement along the central axis for engaging the valve seat and closing a valve opening between the first bore and second bore, and a coiled return spring mounted in the housing for urging the reciprocating seal towards the first bore to open the valve opening, the return spring having a first end acting on the reciprocating seal and a second end engaging the spring seat. The second bore and third bore each have a different cross-sectional shape transverse to the central axis.

According to at least one example aspect a by-pass valve for a heat exchanger circuit, the by-pass valve including a housing formed from plastic material and defining a first bore with a valve opening communicating therewith, the valve opening having a peripheral valve seat facing the first bore, the housing defining an assembly opening communicating with the first bore opposite the valve seat, an actuator located in the first bore and having a reciprocating seal disposed for movement along an axis for engaging the valve seat and closing the valve opening, and a closure cap formed from plastic material and closing the assembly opening, the closure cap being sealably joined to the housing by a permanent joint.

According to at least one example aspect of the invention is a method for making a by-pass valve for a heat exchanger circuit, including: providing a housing defining a first bore with a valve opening communicating therewith, the valve opening having a peripheral valve seat facing the first bore, the housing including an assembly opening opposite the valve seat; providing a closure cap; providing an actuator having a reciprocating seal and inserting the actuator into the first bore through the assembly opening so that the actuator is located in the first bore for movement along a central axis for engaging the valve seat and closing the valve opening; and permanently connecting the closure cap to the housing to seal the assembly opening.

According to at least one example aspect of the invention is a by-pass valve for a heat exchanger circuit, the by-pass valve including a housing defining a communicating first bore and second bore with a peripheral valve seat located at a junction thereof about a valve opening, the first bore, second bore and valve opening forming at least a portion of a closable flow path between a first opening and a second opening in the housing. The by-pass valve includes an actuator located in the first bore and having a reciprocating seal disposed for movement to engage the valve seat and close the valve opening, a coiled return spring mounted in the housing for urging the reciprocating seal towards the first bore to open the valve opening, the return spring having a first end acting on the reciprocating seal, and a second end. A discrete spring support extends across the second bore and has a surface supporting the second end of the return spring, the spring support including at least one fluid flow opening there through for fluid flowing through the valve opening.

According to at least one example aspect of the invention is a by-pass valve for a heat exchanger circuit, the by-pass valve including a housing defining first and second bores aligned along a central axis and communicating through a valve opening surrounded by a peripheral valve seat, the first bore, second bore and valve opening forming at least a portion of a closable flow path between a first opening and a second opening in the housing. The by-pass valve also includes a temperature responsive actuator located in the first bore and having a reciprocating central shaft disposed along said central axis, the central shaft having a closed end portion, an annular sealing member slidably mounted on the central shaft and extending outward from the central shaft to engage the valve seat and, together with the closed end portion, close the valve opening, bias means for urging the annular sealing member toward the valve seat, and a coiled return spring mounted in the housing for urging the central shaft closed end portion to retract and open the valve opening, the return spring having a first end connected to the closed end portion and a second end engaging a spring support in the housing facing the first bore. The valve seat and the annular sealing member have corresponding sloping surfaces that cooperate when the sealing member engages the valve seat.

According to at least one example aspect of the invention is a by-pass valve for a heat exchanger circuit, the by-pass valve including a housing formed from a plastic material and defining a first bore with a valve opening communicating therewith, the valve opening having a peripheral valve seat facing the first bore, the housing defining an assembly opening communicating with the first bore opposite the valve seat, the first bore and valve opening forming at least a portion of a closable flow path between a first opening and a second opening in the housing; an actuator located in the first bore and having a reciprocating seal disposed for movement along an axis for engaging the valve seat and closing the valve opening; and a closure cap formed from resilient material and closing the assembly opening, the closure cap being sealably mounted in a end of the upper bore adjacent the assembly opening, the housing including surfaces between which the closure cap is compressively engaged.

BRIEF DESCRIPTION OF THE DRAWINGS

Example embodiments of the invention will now be described with reference to the accompanying drawings, throughout which similar elements and features are denoted by the same reference numbers, and in which:

FIGS. 5A-5D show views of a closure cap used in the by-pass valve of FIGS. 1 and 2, wherein FIG. 5A is a perspective view, FIG. 5B is an elevational view, FIG. 5C is a bottom plan view, and FIG. 5D is a sectional view taken along the line A-A of FIG. 5C;

FIG. 12 is an elevational view, in cross-section, of a by-pass valve having a valve sealing configuration according to a further example embodiment of the invention, showing the by-pass valve in an open position;

FIG. 13 is a plan view of an annular valve member used in the by-pass valve sealing configuration of FIG. 12;

FIG. 14 is a sectional view of the annular valve member, taken across lines C-C of FIG. 13;

DESCRIPTION OF EXAMPLE EMBODIMENTS

Figure 1:
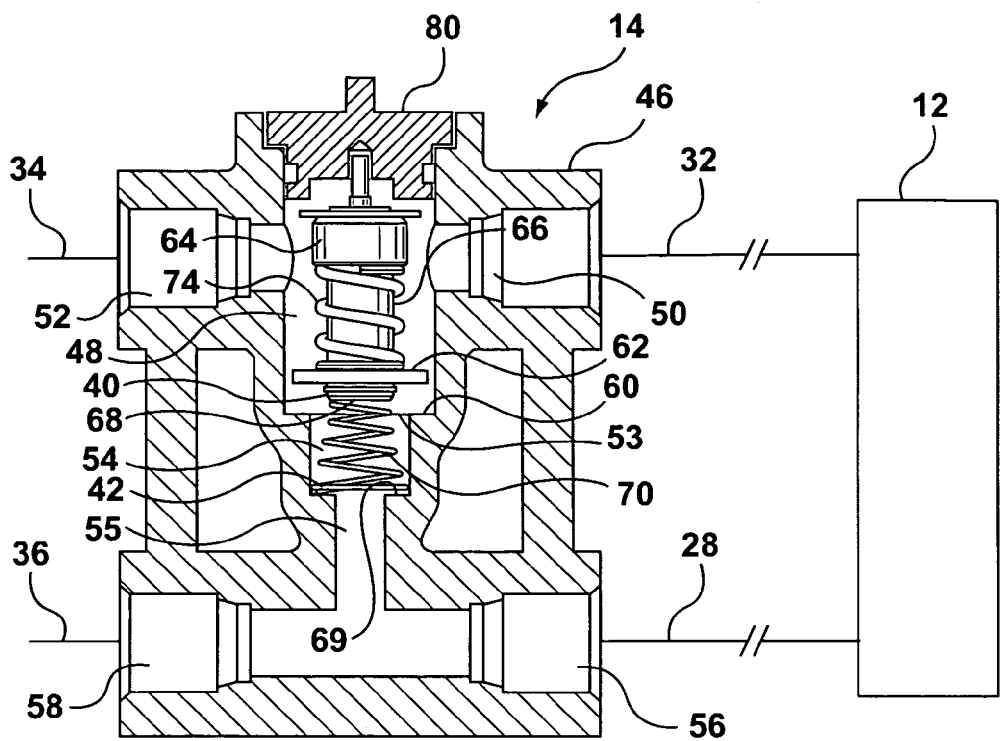
FIG. 1 is an elevational view, partly in cross-section, of a by-pass valve according to an example embodiment of the invention, showing the by-pass valve in an open position.

Referring firstly to FIG. 1, there is shown a by-pass valve, indicated generally by reference 14. By-pass valve 14 may be used in a heat exchanger circuit to control the flow a fluid to a heat exchanger 12, to which first and second conduits 28 and 32 are connected. Conduits 28, 32 are connected to inlet and outlet ports in by-pass valve 14 as will be described further below. Conduits 34, 36 are also connected to ports in by-pass valve 14 as will be described further below. By-pass valve 14 is referred to as a four port by-pass valve, because four conduits 28, 32, 34 and 36 are connected to by-pass valve 14.

Referring now to FIGS. 1-4, the by-pass valve 14 has a housing 46 with serially communicating coaxial first bore 48, second bore 54 and third bore 55 therein. In an example embodiment, the housing 46 is formed of a moldable material such as a plastic material which may be a thermoplastic or a thermosetting material and which may contain reinforcement such as glass fiber or particulate reinforcement. Housing 46 defines two main ports or openings 50, 52 communicating with the first bore 48. Third bore 55 has a smaller cross-sectional flow area than that of second bore 54. First bore 48 communicates directly with second bore 54 which in turn communicates through third bore 55 with two openings or branch ports 56, 58. Conduits 28, 36 are connected respectively to the branch ports 56, 58. Conduits 32 and 34 are connected to main ports 50 and 52, respectively. Ports 50, 52, 56 and 58 may be internally threaded for receiving threaded end portions of conduits 32, 34, 28 and 36, respectively, however the conduits and ports could alternatively be connected using other methods, including for example molding the ports around the conduits.

Second bore 54 has a peripheral valve seat 60 facing first bore 48. In the illustrated embodiment, valve seat 60 is an annular shoulder formed about valve opening 53 by housing 46 at a transition or junction between first bore 48 and second bore 54. A movable valve member 62 is adapted to engage valve seat 60 to open and close valve opening 53. A temperature responsive actuator 64 is located inside first bore 48 and is operably coupled to valve member 62 to move valve member 62 thereby opening and closing valve opening 53. Actuator 64 is sometimes referred to as a thermal motor and it is a piston and cylinder type device wherein the cylinder is filled with a thermal sensitive material, such as wax, that expands and contracts causing the actuator to extend axially upon being heated to a predetermined temperature.

Figure 2:
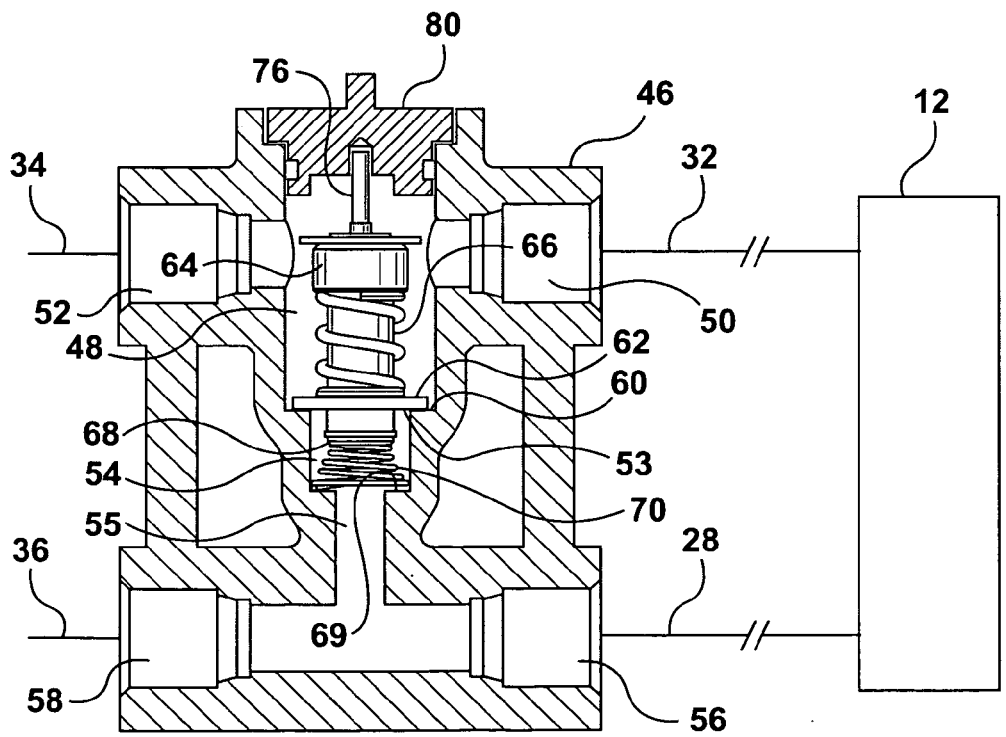
FIG. 2 is an elevational view, partly in cross-section, showing the by-pass valve in a closed position.

It will be seen from FIGS. 1-4 that actuator 64 is located along a central axis of first bore 48 and second bore 54. In an example embodiment, coaxial first bore 48 and second bore 54 are both generally cylindrical, with second bore 54 having a smaller diameter than first bore 48. The cylinder of actuator 64 forms a central shaft 66 disposed along the central axis of first bore 48 and second bore 54. Central shaft 66 has a closed end portion 68 that has a diameter less than that of second bore 54 and which partially closes valve opening 53. Valve member 62, which is in the form of an annular ring located adjacent to closed end portion 68 in its normal or at rest position as indicated in FIG. 1, extends transversely from the central shaft 66 to engage valve seat 60 to close valve opening 53 as indicated in FIG. 2. The annular ring 62 and closed end portion 68 form a reciprocating plug which moves along the central axis to open and close valve opening 53. Annular ring or valve member 62 is slidably mounted on central shaft 66.

Figure 4:
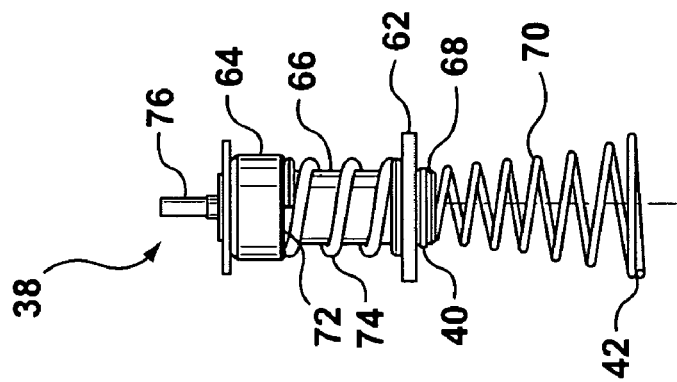
FIG. 4 is an elevational view of a valve assembly used in the by-pass valve of FIGS. 1 and 2.

Third bore 55, which is coaxial with first bore 48 and second bore 54 has a different cross-sectional flow area than second bore 54. In the presently described example embodiment, the cross-sectional flow area of the third bore 55 is smaller than that of the second bore 54, such that the housing 46 defines a peripheral spring seat 69 facing the second bore and first bore 48 at a junction or transition between the second and third bores 54, 55. A return spring 70 has a first end 40 attached to closed end portion 68 by being located in a groove (not shown) formed in closed end portion 68. The return spring 70 has a second end 42 located in spring seat 69. Return spring 70 thus urges the central shaft 66 away from valve seat 60 into its retracted position of FIG. 1, and acts as a stop for preventing annular ring 62 from sliding off central shaft 66. As best seen in FIG. 4, the return spring 70 has a coil diameter that gets larger as the distance from end portion 68 increases, such that the return spring 70 tapers outward from first end 40 to the second end 42. In particular, the spring coil diameter at first end 40 is sized to fit around closed end portion 68, and the spring coil diameter at second end 42 is sized about the same as the diameter of second bore 54.

As will be apparent from FIG. 4, thermal motor 64, override spring 74, annular ring 62 and return spring 70 form a valve cartridge or subassembly 38 for by-pass valve 14. As best seen in FIG. 4, central shaft 66 includes an inner annular shoulder 72, and a override spring 74 mounted on central shaft 66 between shoulder 72 and annular ring 62. The override spring 74 urges or biases annular ring 62 toward the stop or return spring 70, and thus toward valve seat 60.

Figure 3:
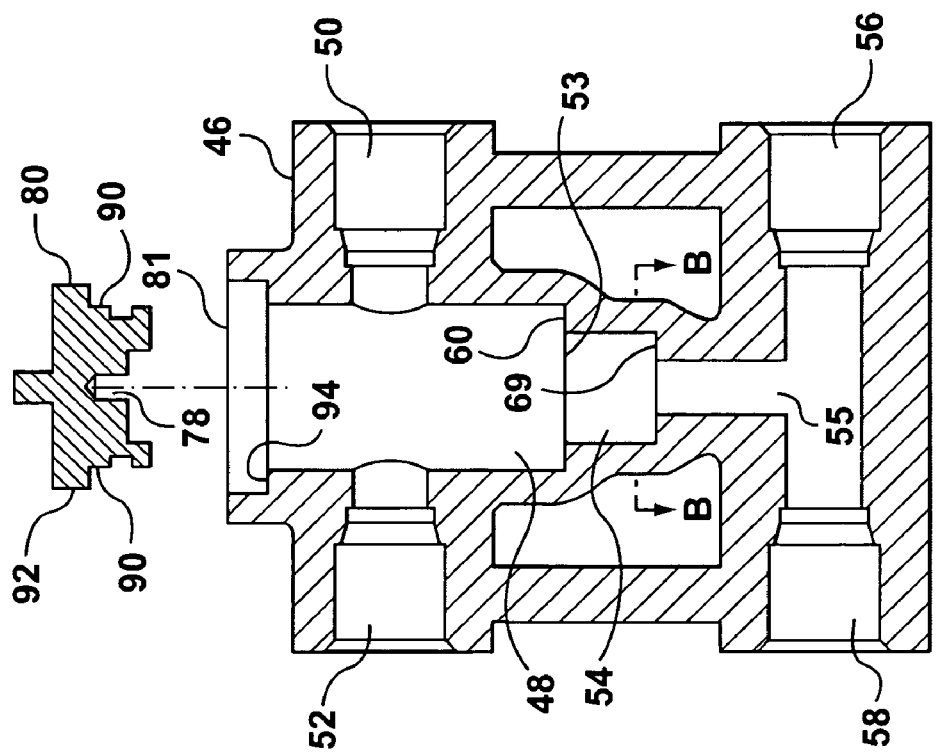
FIG. 3 is an elevational cross-section exploded view showing a housing and closure cap of the by-pass valve of FIGS. 1 and 2.
Figure 5D:
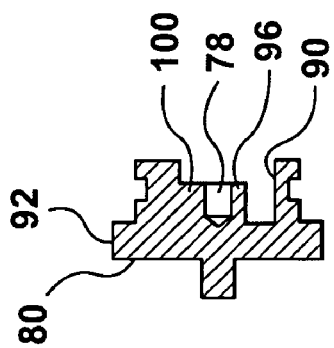
Figure 5C:
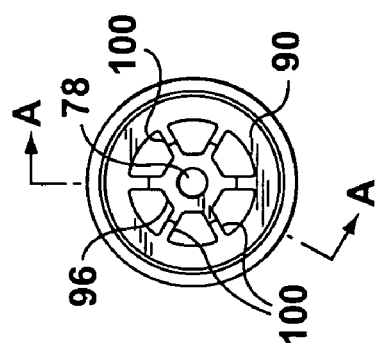
Figure 5B:
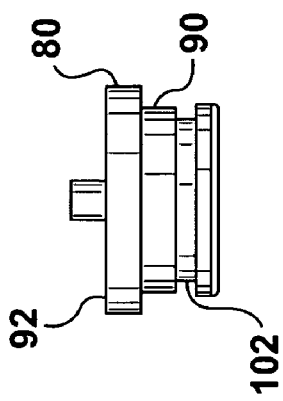
Figure 5A:
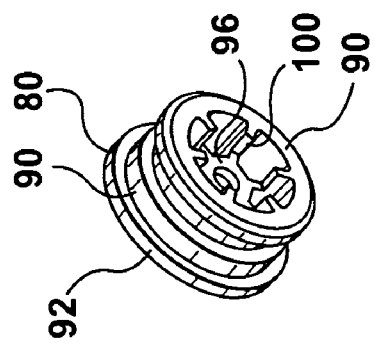

As best seen in FIG. 3, the first bore 48 includes an opening 81 that opposes valve opening 53 and through which the valve assembly 38 of FIG. 4 can be inserted into first bore 48 during assembly of the by-pass valve 14. A closure cap 80 is inserted into the opening 81 to seal the first bore 48 after the valve assembly 38 is in place. As with housing 46, closure cap 80 may be formed from a moldable material such as a plastic material which may be a thermoplastic or a thermosetting material and which may contain reinforcement such as glass fiber or particulate reinforcement. The closure cap 80 is in at least one example embodiment ultrasonically welded to the housing 46 to form a secure seal.

Thermal motor or actuator 64 has a piston 76 (see FIG. 4) that is attached or fitted into an axial recess 78 (see FIG. 3) formed in closure cap 80. As will be described in more detail below, when thermal motor 64 reaches a predetermined temperature, it extends axially. Since piston 76 is fixed in position, central shaft 66, which is part of thermal motor 64, moves downwardly through second bore 54 compressing return spring 70 and closing valve opening 53. When the temperature inside first bore 48 drops below the predetermined temperature, thermal motor 64 retracts and return spring 70 urges central shaft 66 upwardly until return spring 70 engages annular ring 62 and lifts it off valve seat 60 again opening valve opening 53. When valve opening 53 is opened as indicated in FIG. 1, return spring 70 extends through second bore 54 and partially into first bore 48.

The operation of by-pass valve 14 will now be described with reference to FIGS. 1-4. The heat exchange circuit in which the valve 14 is used can be operated with either conduit 34 or conduit 36 being the inlet conduit, the other one being the outlet conduit. Where conduit 34 is the inlet conduit, or in other words, receives hot transmission oil from the transmission, this is sometimes conveniently referred to as forward flow. In this case, conduit 36 is the outlet conduit and returns the transmission oil to the transmission after it has been cooled by heat exchanger 12.

Where conduit 36 is the inlet conduit receiving the hot transmission fluid or oil from the transmission and conduit 34 is the outlet or return conduit for delivering the cooled oil back to the transmission, this configuration is sometimes conveniently referred to as reverse flow.

Dealing first with the forward flow configuration, if the transmission oil and heat exchange circuit 10 have been warmed up to operating temperatures, by-pass valve 14 appears as in FIG. 2. Hot engine oil enters into inlet conduit 34, passes in series through main port 52, first bore 48 and main port 50 to heat exchanger inlet conduit 32. The hot fluid passes through heat exchanger 12 and returns through outlet conduit 28, passes through branch ports 56, 58 and out through outlet conduit 36 to return to the transmission. In this case, there is substantially no by-pass flow, because valve opening 53 is closed. If the fluid returning to the transmission through conduits 28, 36 drops below a predetermined temperature, by way of non-limiting example about 80 degrees C., actuator 64 retracts causing valve member 62 to lift off valve seat 60 opening valve opening 53, as in FIG. 1. This creates a by-pass flow from conduit 34 through first bore 48 and through valve opening 53 to join the flow in conduit 36 returning to the transmission. If the temperature of the flow or oil is very cold, such as at engine start-up conditions, the oil may be so viscous that virtually no flow goes through heat exchanger 12 and the flow is totally by-passed from inlet conduit 34 to outlet conduit 36. As the oil starts to warm up, however, flow through conduit 32 and heat exchanger 12 starts to increase, and by the time the oil reaches the desired operating temperature, full flow is occurring through heat exchanger 12 and valve member 62 closes valve opening 53 discontinuing the by-pass flow. It will be appreciated that when by-pass valve 14, or at least valve member 62, is open main ports 52 and 50 become respective inlet and outlet ports in this forward flow configuration. In the forward flow configuration, one of the branch ports, namely branch port 56 becomes an inlet port, and the other branch port 58 thus becomes an outlet port communicating with inlet port 56.

In the reverse flow configuration, conduit 36 becomes the inlet conduit receiving hot oil from the transmission, and conduit 34 becomes the outlet conduit returning the cooled transmission oil to the transmission. In this configuration, if the transmission and heat exchange circuit 10 are at operating temperatures, the hot transmission fluid passes through branch port 58, which becomes an inlet port. Valve member 62 is closed so there is no by-pass flow. The hot oil then continues on through branch port 56 which becomes an outlet port communicating with inlet branch port 58. The hot oil goes through conduit 28 and the heat exchanger 12 and returns through conduit 32 to pass in series through second main port 50, first bore 48 and third main port 52 and out through conduit 34 to be returned to the transmission.

If the transmission oil returning to the transmission drops below the predetermined temperature, actuator 64 causes valve member 62 to open creating by-pass flow from valve opening 53 to main port 52 and conduit 34. Again, if the oil is extremely cold, such as at engine start-up conditions, very little, if any, flow passes through heat exchanger 12 and there is almost total by-pass through by-pass valve 14. As the transmission oil starts to warm up, some flow starts to go through heat exchanger 12 and returns through conduit 32 to first bore 48 and back to the transmission through conduit 34. This causes actuator 64 to warm up faster than would otherwise be the case. As the transmission oil returning to the transmission through outlet conduit 34 reaches the predetermined temperature, actuator 64 extends closing valve member 62 and stopping the by-pass flow. In this configuration, any pressure peaks that might occur upon the closing of valve member 62 are attenuated or modulated, because valve member 62 can lift off valve seat 60 by such a pressure surge, since valve member 62 is urged into position by override spring 74 and not solidly in engagement with valve seat 60. In other words, override spring 74 can absorb pressure spikes in inlet conduits 36, 28, so that they do not travel back and adversely affect the transmission. The circuiting of the valve is such that the housing functions as a mixing chamber, in which the by-pass fluid stream and the heat exchanger outlet stream can mix in direct contact with the thermal actuator, so that thermal transients are damped, and the actuator is able to directly respond to the mixed oil temperature being returned to the transmission. Also during the transition between opening and closing, the hot by-pass stream and cooler oil cooler return stream are mixed (as controlled by the directing contacting actuator 64) to dampen any temperature transients in the oil being returned to the transmission.

In the reverse flow configuration, main ports 50, 52 become respective inlet and outlet ports for by-pass valve 14.

As actuator 64 is located in first bore 48 with oil continuously flowing therethrough, actuator 64 warms up and cools off quickly. Also, if the transmission oil becomes over-heated or experiences a temperature spike, actuator 64 is not damaged, because it will normally be exposed to some return flow from heat exchanger 12 in first bore 48 in the reverse flow configuration, or in branch ports 56, 58 in the forward flow configuration. Further, if actuator 64 is overheated and tends to expand too far, it will not be damaged, because central shaft 66 can extend through second bore 54 as required.

Having described the overall configuration and operation of an example embodiment of the by-pass valve 14, particular features of the by-pass valve will now be described in greater detail.

Turning to FIG. 3 and FIGS. 5A-5C, in the illustrated embodiment, cap 80 defines an outer cylindrical wall 90 sized to fit in the upper end of first bore 48, and a larger diameter disk-like head 92. First bore 48 has a cap seat 94 formed about a circumference of opening 81 in which enlarged cap head 92 is located. As illustrated, the axial recess 78 (which receives an end of thermal motor piston 76) is defined by an inner cylindrical wall 96 that is radially spaced from external cylindrical wall 90. A series of uniformly spaced radial webs 100 extend between inner and outer walls 96, 90. An annular groove 102 (FIG. 5B) may be formed in an outer surface of the outer cylindrical wall 90. As noted above, cap 80 can be ultrasonically welded to housing 46 in order to seal the opening 81 of first bore 48, providing a light weight, inexpensive and durable means for sealably closing assembly opening 81 of the first bore 48 which, in at least some applications, will not require an additional seal such as an O-ring, and/or will not require an addition retaining member such as a C-clip. Although the presently described cap provides certain advantages, in some embodiments plastic cap 80 could be replaced with a metal cap having an annular sealing ring, and/or could be secured in place through some other non-permanent means such as, for example, with a C-clip, or by being threaded, or having a twist lock configuration, rather than through ultrasonic welding. Furthermore, a permanent leak resistant joint between the cap 80 and housing 46 could be formed by methods other than ultrasonic welding, such as by friction welding, or through chemical bonding. Chemical bonding could include the use of an intermediate adhesive or solvent bonding in which a solvent is used to temporarily disolve cooperating surfaces that then join together, thereby providing a bonding effect similar to ultrasonic or friction welding. Additionally, the cap 80 may be used with housing and valve assembly combinations that are different from that shown in the Figures and described herein.

Figure 6:
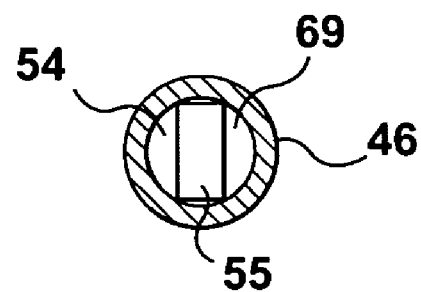
FIG. 6 is a sectional view of the housing, taken along the line B-B of FIG. 3.

With reference to FIGS. 3 and 6, third bore 55 will now be discussed in greater detail. As indicated above, the second bore 54 communicates with branch ports 56 and 58 through third bore 55, with peripheral spring seat 69 facing second bore 54. The third bore 55 in combination with peripheral spring seat 69, allows the return spring 70 to be supported above the internal passage through housing 46 that is provided by cooperating and coaxial branch ports 56 and 58, thereby providing unimpeded flow between the branch ports 56 and 58. Spring seat 69 is defined by housing 48 as a result of the reduction in cross-sectional flow area between the second bore 54 and the third bore 55. As noted above, second bore 54 is cylindrical, and thus has a circular cross-sectional flow area transverse to its axis. In an example embodiment, the third bore 55 has a non-circular cross-sectional flow area, and in particular, as seen in FIG. 6, the third bore 55 has a rectangular cross-sectional area along its length. Thus, the size of the spring seat 69 varies about the periphery of the third bore 55. The use of a third bore 55 having a non-circular cross-section allows the flow area of the third bore 55 to be maximized, while at the same time providing a stable seat 69 for return spring 70. Such a non-circular configuration may be particularly advantageous in embodiments where the coil diameter of the return spring 70 does not increase towards the spring seat 69, in which case a spring seat extending further inward from the outer circumference of the wall defining second bore 54 would be required. Instead of being rectangular, other non-circular cross-sectional configurations could be used, for example other multi-sided configurations such as square or polygon, or curved configurations such as elliptical, could be employed.

In some embodiments, third bore 55 may be cylindrical with a circular cross-sectional area. For example, when third bore 55 is used in combination with an outwardly tapering return spring 70, in some applications a non-circular third bore 55 may not offer that substantial an advantage over a circular third bore 55. However, in other applications, the increased flow permitted by a non-circular third bore 55 may be highly advantageous.

In some embodiments, spring seat 69 may be provided by means other than a transition between second bore 54 and a cooperating coaxial third bore 55. For example, the second and third bores could be replaced with a single bore having a substantially uniform diameter along its entire length, and spring seat 69 could be accomplished by an inwardly extending ring formed on the wall of the bore 54 or 55 about opening 53, or by other inward projections formed on the wall of the bore 54 or 55.

With reference again to FIGS. 1-4, tapered return spring 70 will now be discussed in greater detail. As will be appreciated from the above description, the piston or central shaft 66 of valve assembly 38 has a smaller diameter than second bore 54 so that closed end portion 68 can extend into second bore 54, and also to facilitate fluid flow around the shaft 66 when valve member 62 is not in valve seat 60. Thus, the first end 40 of return spring 70 that is attached to end portion 68 will also have a smaller diameter than the second bore 54. As indicated above, the diameter of the successive coils of the return spring 70 increase from the first end 40 to the seat engaging second end 42, such that the diameter of the second end 42 is substantially the same as or close to the inner diameter of second bore 54. Such a spring configuration can provide a number of advantages. For example, having a second end 42 diameter that is the same or close to the same size as the second bore diameter provides a self-centering and self locating feature and assists in positioning the spring in the valve opening 53 and maintaining the second end 42 in correct alignment with spring seat 69, thereby allowing a smaller spring seat 69 (and hence larger third bore 55) to be used than might otherwise be required if a return spring of uniform coil size were employed. The spring 70 may also assist in centering the valve assembly 38, including valve member 62, during operation of the by-pass valve. Additionally, the use of a spring of varying coil diameter allows for a greater distance between adjacent coils as the coils expand, as adjacent coils are not only axially spaced from each other (as in a uniform diameter spring), but are also radially spaced from each other. Thus, there is increased area for fluid to flow through the coils of the tapered return spring 70 such that spring 70 offers less flow resistance than a similar non-tapered return spring.

Figure 7:
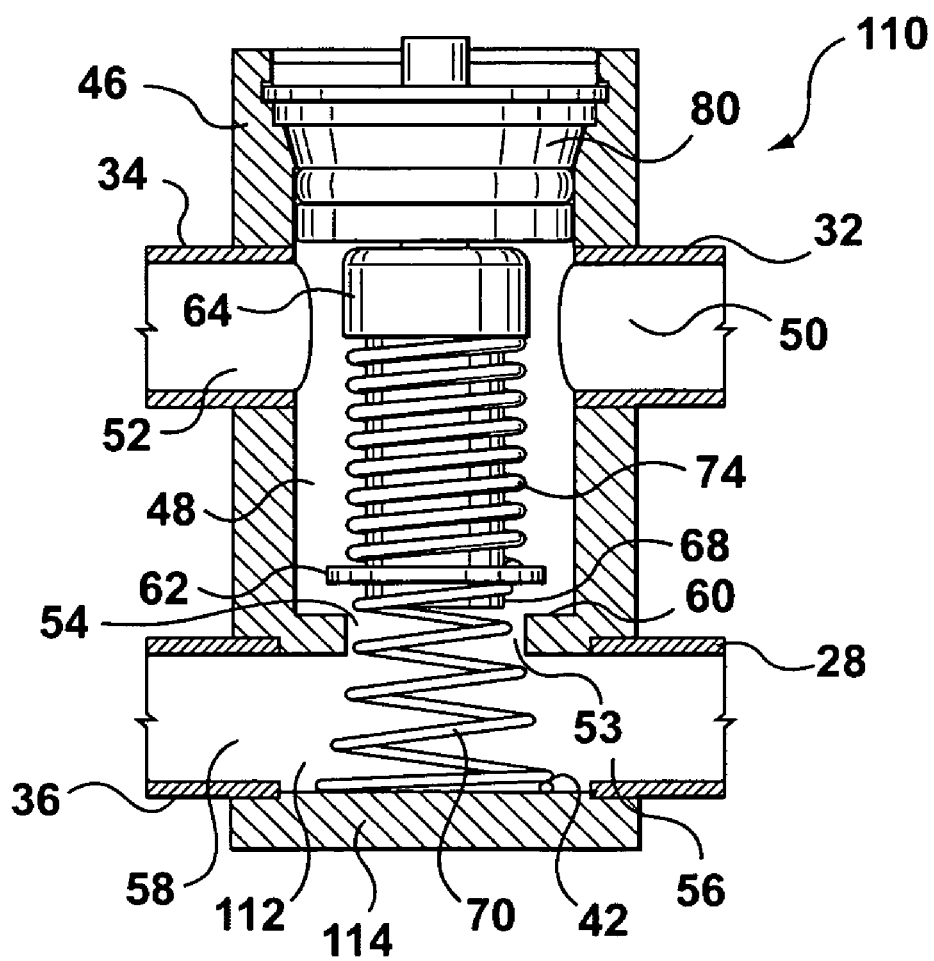
FIG. 7 is an elevational view, partly in cross-section, of a by-pass valve according to a further example embodiment of the invention, showing the by-pass valve in an open position.

In some embodiments, as has been suggested above and will be explained below, a spring of uniform diameter may be used in place of tapered spring 70. Additionally, in some embodiments, the tapered return spring 70 may be used in combination with a by-pass valve having features other than those described above. For example, FIG. 7 shows a further example embodiment of an open by-pass valve 110, in which tapering return spring 70 may be used. The by-pass valve 110 is similar in configuration and operation to by-pass valve 14, with differences that will be apparent from the Figures and present description. By-pass valve 110 is a two-bore design in that the third bore 55 is omitted. The second bore 54 communicates directly with a branch port flow passage 112 formed by coaxial and cooperating branch ports 56, 58. The valve seat 69 and valve opening 53 are located at the juncture between first bore 48 and second bore 54. In such embodiment, the return spring 70 extends across passage 112 and its second end 42 rests against a wall 114 of branch port flow passage 112 that faces the first bore 48 and valve opening 53. In such configuration, the tapering spring 70 offers less flow resistance in passage 112 than a uniform diameter spring would.

Turning again to the by-pass valve configuration of FIGS. 1-4, in some embodiments branch ports 58 and 56 may be omitted, and the third bore 55 may communicate directly with one of the conduits 28 or 36, in which case the by-pass valve would be a three port valve, with third bore 55 being an inlet or outlet port to the by-pass valve. In such a configuration, whichever of the conduits 28 or 36 is not connected to communicate with third bore 55 will be connected to the other conduit 28 or 36 at a location spaced apart from the by-pass valve.

Figure 8:
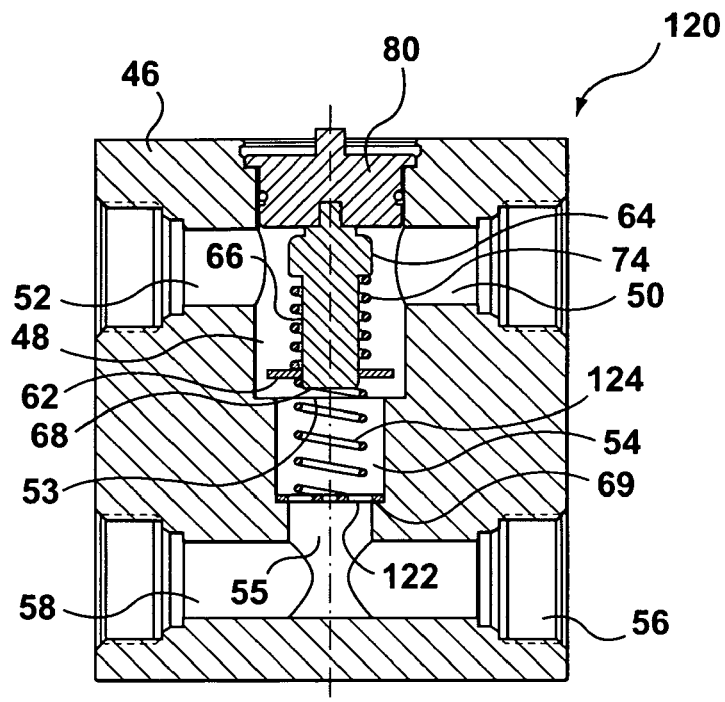
FIG. 8 is an elevational view, in cross-section, of a by-pass valve according to a further example embodiment of the invention, showing the by-pass valve in an open position.
Figure 9A:
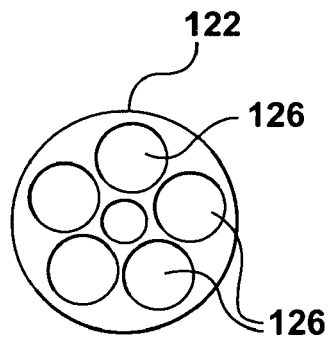
FIGS. 9A and 9B are plan views each showing an example of a return spring support member for use in the by-pass valve of FIG. 8.
Figure 9B:
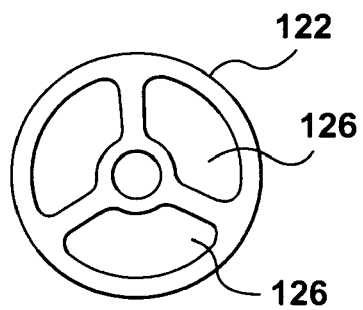

As noted above, in some embodiments a uniform coil return spring may be used in place of a tapered return spring 70, and in this regard reference is now made to FIG. 8 which shows a further example embodiment of an open by-pass valve 120, in which a straight return spring 124 is used. The by-pass valve 120 is similar in configuration and operation to by-pass valve 14, with differences that will be apparent from the Figures and present description. In the present embodiment, the extending end of the uniform width return spring 124 is smaller than the third bore 55 that communicates with second bore 54, and thus a discrete spring support member 122, examples of which are shown in plan view in FIGS. 9A and 9B, is positioned in peripheral seat 69. Discrete support member 122, which may be formed from metal or plastic and/or other materials, is formed separately from housing 46 and positioned on seat 69. In some example embodiments, the support member 122 may be connected to the extending end of return spring 124 prior to the insertion of valve assembly 38 into the first bore 48. When the valve is assembled, the extending end of return spring 124 rests against the spring support member 122, and the other end of the return spring engages end portion 68 of thermal motor shaft 66. Spring support member 122 can be a circular planar disk-like member with a series of flow openings 126 formed therethrough. Support member 122 could take a number of different configurations to fulfill its dual function of supporting spring 124 while allowing fluid to flow through the support member, with FIGS. 9A and 9B showing but two possibilities. In the by-pass valve configuration of FIG. 8, support member 122 allows third bore 55 to be larger than if the uniform width return spring 124 rested directly on seat 69 without the support member. In some example embodiments, support member 122 may be used in combination with a tapering return spring 70.

Figure 10:
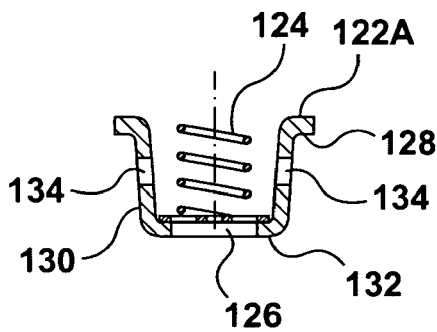
FIGS. 10 and 11 are elevational views, in cross-section, each showing a further example of a return spring support member for use in the by-pass valve of FIG. 8.
Figure 11:
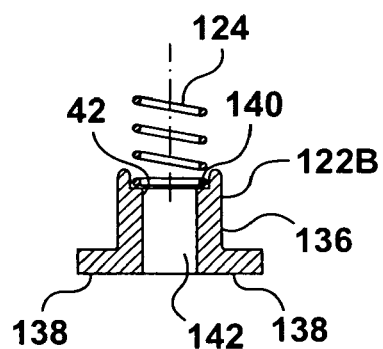

In at least one example embodiment, planar support member 122 is replaced with a cup-like support member 122A, as shown in FIG. 10. Support member 122A includes an annular wall 130 having an outer peripheral flange 128 at one end thereof and a radially inwardly extending flange 132 at an opposite end thereof. The outer flange 128 sits on seat 69, the annular wall 130 extends into third bore 55, and return spring 124 is seated on inner flange 132. An axial flow opening 126 is defined by flange 132. Annular wall 130 may be cylindrical, or may taper inwards as the distance from seat 69 increases. In some embodiments, particularly in tapering embodiments, flow openings 134 may extend through the annular wall 130.

In some embodiments, a further cup-like support member 122B, having a configuration substantially opposite that of support member 122A, is used in combination with seat 69 to support the return spring 124. Support member 122B includes an annular wall 136 having an outer peripheral flange 138 at one end and a shoulder defining a spring seat 140 at an opposite end thereof. In use, the outer peripheral flange 138 rests on seat 69, the annular wall 136 extends into the second bore 54 and the second end 42 of return spring 124 rests in seat 140. The cup configurations 122A and 122B assist in locating and retaining return spring 124.

Turning now to FIGS. 12-13 a further valve seat and valve member combination that can be applied to any of the by-pass valves described above will now be explained in the context of by-pass valve 120. In FIG. 12, the annular valve member 62 and it cooperating valve seat 68 have been modified, the modified elements being denoted by 62' and 68', respectively. The valve seat 68', formed about the periphery of an end of second bore 54 facing the first bore 48, has an inwardly tapering profile. Similarly, annular valve member 62', which in one example embodiment is formed from a plastic material, has a tapering outer surface facing valve seat 68'. Thus, valve seat 68' and valve member 62' have corresponding opposing truncated-conical or frusta-conical surfaces that cooperate when in the closed position to seal valve first bore 48 from valve opening 53. The use of sloping or tapering engagement surfaces provides a larger engagement interfaces between valve member 62' and valve seat 68' than if the engagement surfaces are simply at right angles to the first bore and valve opening axes. The valve member 62' defines an axial cylindrical opening 146 through which thermal motor shaft 66 passes. In an example embodiment, a lip or flange 148 is provided about a periphery of the opening 146 on a side thereof that faces away from the second bore 54, thereby providing a longer interface between member 62' and shaft 66, making it more difficult for fluid to leak between shaft 66 and valve member 62'. Valve member 62' and 68' may provide an improved seal in some applications. The relatively large internal surface that defines opening 146 provides a large contact area along shaft 66, reducing the chance for binding of the sealing valve member 62 as it moves along the shaft.

Figure 15:
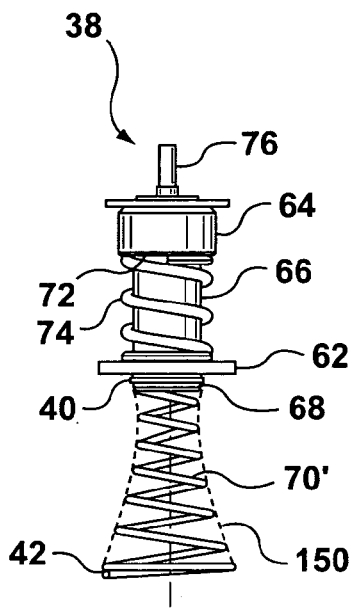
FIG. 15 is an elevational view of a valve assembly having a further embodiment of a return spring.

Turning again to the example embodiment of the by-pass valve shown in FIGS. 1-4 and 7, although the return spring 70 has been shown as having coils that continuously increase in diameter from the first end 40 to the second end 42 of the spring 70, in some example embodiments the coil diameter does not steadily increase from the first end to the second end. By way of example, FIG. 15 shows an alternative return spring 70' that is used with valve assembly 38 in some example embodiments. As indicated by dashed line 150, the return spring 70' has an hourglass shape in that as the axial distance increases from the first end 40, the coil diameters first get smaller and then increases in size to the second end 42 of the return spring 70'. Thus, along a first axial length of the return spring 70', coils of the return spring 70' have decreasing diameters as the distance of the coils from the first end 40 increases, and along a second axial length of the return spring 70' that is further from the first end 40 than the first axial length, coils of the return spring 70' have increasing diameters as the distance of the coils from the first end 40 increases. Such a configuration can in some applications facilitate the flow of oil through the spring coils with reduced flow resistance, especially high viscosity oil at low temperatures, and also facilitate the passage of oil through the coils at higher temperature when actuation of the thermal element causes the spring 70' to compress.

Figure 16:
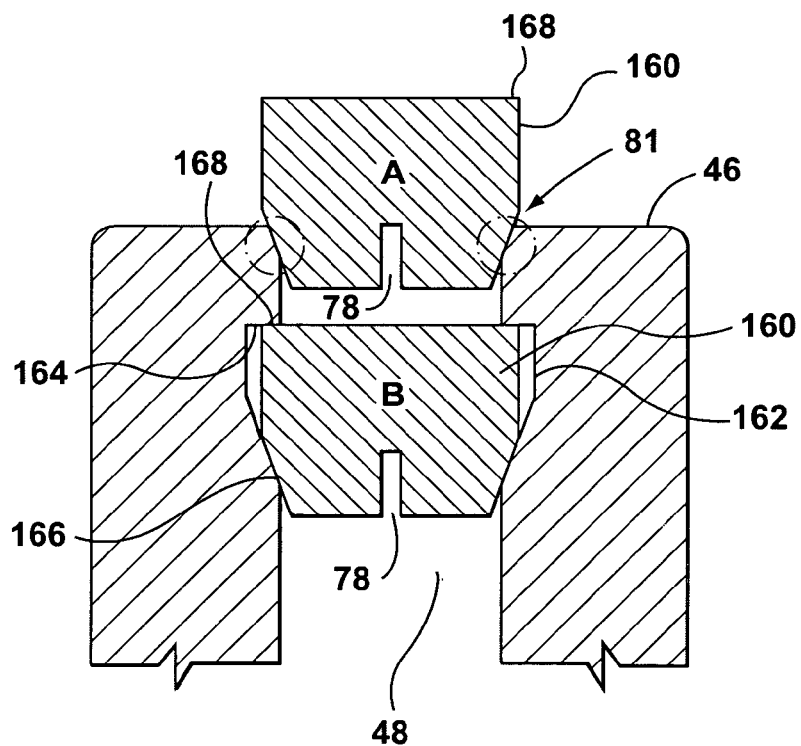
FIG. 16 is a partial sectional view of a further embodiment of a cap received in an upper end of the by-pass valve housing.
Figure 17:
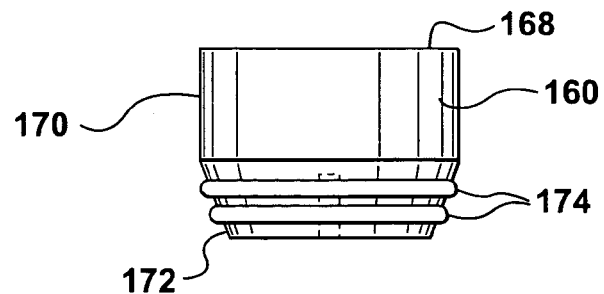
FIG. 17 is an elevational view of the cap of FIG. 16.

FIGS. 16 and 17 show another cap configuration for closing the assembly opening 81 in housing 46. The cap 160, which may be used in any of the above described configurations, is formed from a resilient material (which can be plastic), such that cap 160 can be inserted, with some radial compression occurring to it, through the assembly opening 81 in the housing 46. Thus, the opening 81 has a smaller diameter than the cap 160. FIG. 16 shows the cap 160 in a first position "A" in which the cap 160 is just starting to be inserted through opening 81, and in a second position "B" in which the cap 160 is inserted into an upper end of the first bore 48.

The upper end of first bore 48 includes an annular recess 162 into which at least a portion of the cap 160 expands once the cap has been inserted into place. Once inserted, the cap 160 is effectively permanently locked in place. The recess 162 terminates at an upper annular shoulder or seat 164. At a lower end, the recess 162 has an inwardly tapering annular wall 166 that opposes seat 164 at an oblique angle. The cap 160 has an upper surface 168 for engaging seat 164. The cap 160 has an upper cylindrical portion 170 which is received within recess 162, and has a lower tapering annular wall portion 172 for engaging the wall 166 of recess 162. Once the cap 160 is inserted into position, its upper surface 168 engages seat 168 and its lower tapering wall portion 172 engages correspondingly tapered recess wall 166, thus placing the cap 160 under axial loading to prevent movement of it relative to housing 46. In an example embodiment, the cap 160 is sufficiently preloaded (i.e. compressed between surfaces 164 and 166) after insertion such that its stays secure throughout various temperature variation and other stresses that occur during use and the lifespan of the valve. In some embodiments, cap 160 may include one or more annular protrusions or beads 174 formed on tapering portion 172 for providing further sealing between the cap 160 and housing 46. Alternatively, one or more annular beads 174 could be located on the wall 166 in addition to or instead of on portion 172. In one example embodiment, one annular bead 174 is located on portion 172.

Having described example embodiments of the invention, it will be appreciated that various modifications in addition to those already set forth can be made to the structures described above. For example, in some embodiments either both or one or the other of the housing and cap could be made of materials other than plastic such as metal. A number of features have been described above, and different features and combinations of features may be used in different embodiments.

The by-pass valves have been described above for use with an automotive transmission oil cooler as the heat exchanger, but the by-pass valves could be used with any other types of heat exchanger, such as fuel cooling heat exchangers, and in non-automotive applications as well. Other types of thermal actuators can be used than the wax-type actuator 64. For instances, bimetallic or shape memory alloy thermal responsive actuators could be used to move valve member. Further modifications to the structures described will be apparent to those skilled in the art.

As will be apparent to those skilled in the art in the light of the foregoing disclosure, many alterations and modifications are possible in the practice of this invention. Accordingly, the scope of the invention is to be construed in accordance with the substance defined by the following claims.

What is claimed is:

1. A by-pass valve for a heat exchanger circuit, the by-pass valve comprising:
   a housing defining communicating first and second bores therein, first and second main ports communicating with the first bore, and at least a further port communicating with the second bore, the second bore having a central axis and a peripheral valve seat about a valve opening facing the first bore;
   a temperature responsive actuator located in the housing and having a reciprocating central shaft disposed along said central axis, the central shaft having a closed end portion;
   an annular sealing member slidably mounted on the central shaft and extending outward from the central shaft to engage the valve seat and, together with the closed end portion, close the valve opening;

bias means for urging the annular sealing member toward the valve seat; and a coiled return spring mounted in the housing for urging the central shaft closed end portion to retract and open the valve opening, the return spring having a first end connected to the closed end portion and a second end engaging a spring support in the housing facing the first bore, the return spring having a larger diameter at its second end than its first end, wherein along a first axial length of the return spring, coils of the return spring have decreasing diameters as the distance of the coils from the first end increases, and along a second axial length of the return spring that is further from the first end than the first axial length, coils of the return spring have increasing diameters as the distance of the coils from the first end increases.

2. The by-pass valve of claim 1 wherein the housing includes a branch port forming with the further port a branch port passage that communicates with the second bore, the spring support being located in the branch port passage.

3. A by-pass valve for a heat exchanger circuit, the by-pass valve comprising:

a housing defining communicating first, second and third bores therein, first and second main ports communicating with the first bore, and at least a further port communicating with the third bore, the second bore having a central axis and a peripheral valve seat about a valve opening facing the first bore, the third bore serially communicating with the second bore, the second bore communicating directly with the first bore, the second bore having a larger cross-sectional flow area than the third bore;

a temperature responsive actuator located in the housing and having a reciprocating central shaft disposed along said central axis, the central shaft having a closed end portion;

an annular sealing member slidably mounted on the central shaft and extending outward from the central shaft to engage the valve seat and, together with the closed end portion, close the valve opening;

bias means for urging the annular sealing member toward the valve seat; and a coiled return spring mounted in the housing for urging the central shaft closed end portion to retract and open the valve opening, the return spring having a first end connected to the closed end portion and a second end engaging a spring support in the housing facing the first bore, the return spring having a larger diameter at its second end than its first end, wherein the spring support includes a peripheral spring seat engaging the second end of the return spring, the peripheral spring seat being located at a transition between the second bore and the third bore, where the third bore has a non-circular cross-sectional area transverse to the central axis and the second bore has a circular cross-sectional area transverse to the central axis.

4. The by-pass valve of claim 3 including a closure cap, the housing including an assembly opening located opposite the valve seat that is sealed shut by the closure cap, the closure cap and housing being formed from plastic materials with the closure cap sealably joined to the housing.

5. The by-pass valve of claim 4 wherein the closure cap is joined to the housing by ultrasonic welding, friction welding, adhesive bonding or solvent bonding.

6. A by-pass valve for a heat exchanger circuit, the by-pass valve comprising:

a housing defining communicating first and second bores therein, first and second main ports communicating with the first bore, and at least a further port communicating with the second bore, the second bore having a central axis and a peripheral valve seat about a valve opening facing the first bore;

a temperature responsive actuator located in the housing and having a reciprocating central shaft disposed along said central axis, the central shaft having a closed end portion;

an annular sealing member slidably mounted on the central shaft and extending outward from the central shaft to engage the valve seat and, together with the closed end portion, close the valve opening;

bias means for urging the annular sealing member toward the valve seat; and a coiled return spring mounted in the housing for urging the central shaft closed end portion to retract and open the valve opening, the return spring having a first end connected to the closed end portion and a second end engaging a spring support in the housing facing the first bore, the return spring having a larger diameter at its second end than its first end, wherein the spring support includes a discrete support member inserted into the housing and extending across the second bore and having a flow opening therethrough, and wherein the spring support includes a substantially planar disk having a plurality of flow openings formed therethrough.

7. The by-pass valve of claim 6 wherein the annular sealing member and the valve seat have sloping surfaces that cooperate when in a closed position.

8. A by-pass valve for a heat exchanger circuit, the by-pass valve comprising:

a housing defining communicating first and second bores therein, first and second main ports communicating with the first bore, and at least a further port communicating with the second bore, the second bore having a central axis and a peripheral valve seat about a valve opening facing the first bore;

a temperature responsive actuator located in the housing and having a reciprocating central shaft disposed along said central axis, the central shaft having a closed end portion;

an annular sealing member slidably mounted on the central shaft and extending outward from the central shaft to engage the valve seat and, together with the closed end portion, close the valve opening;

bias means for urging the annular sealing member toward the valve seat; and a coiled return spring mounted in the housing for urging the central shaft closed end portion to retract and open the valve opening, the return spring having a first end connected to the closed end portion and a second end engaging a spring support in the housing facing the first bore, the return spring having a larger diameter at its second end than its first end, wherein the spring support includes a discrete support member inserted into the housing and extending across the second bore and having a flow opening therethrough, wherein the spring support has a cup-like profile, including an annular wall having an outer peripheral flange at a first end thereof and a radially inwardly extending flange at an opposite end thereof, the opposite end being located further from the first bore than the first end thereof, the peripheral flange engaging the support surface about the periphery of the second bore, the second end of the return spring being received within the annular wall and engaging the inwardly extending flange, the at least one flow opening being defined by the inwardly extending flange.

9. The by-pass valve of claim 8 wherein the annular wall tapers inward from the first end of the spring support to the opposite end thereof and flow openings pass through the annular wall.

10. A by-pass valve for a heat exchanger circuit, the by-pass valve comprising:
- a housing defining communicating first and second bores therein, first and second main ports communicating with the first bore, and at least a further port communicating with the second bore, the second bore having a central axis and a peripheral valve seat about a valve opening facing the first bore;
- a temperature responsive actuator located in the housing and having a reciprocating central shaft disposed along said central axis, the central shaft having a closed end portion;
- an annular sealing member slidably mounted on the central shaft and extending outward from the central shaft to engage the valve seat and, together with the closed end portion, close the valve opening;
- bias means for urging the annular sealing member toward the valve seat; and
- a coiled return spring mounted in the housing for urging the central shaft closed end portion to retract and open the valve opening, the return spring having a first end connected to the closed end portion and a second end engaging a spring support in the housing facing the first bore, the return spring having a larger diameter at its second end than its first end, wherein the spring support includes a discrete support member inserted into the housing and extending across the second bore and having a flow opening therethrough,
- wherein the spring support has a cup-like profile, including an annular wall having an outer peripheral flange at a first end thereof and an annular spring seat at an opposite end thereof, the opposite end being located closer to the first bore than the first end thereof, the peripheral flange engaging the support surface about the periphery of the second bore, the second end of the return spring being received within the spring seat.

* * * * *